(12) United States Patent
Heydt et al.

(10) Patent No.: US 6,487,033 B1
(45) Date of Patent: Nov. 26, 2002

(54) MOTOR SPEED OBSERVER FOR DATA PROTECTION IN A DISC DRIVE

(75) Inventors: Jeffrey A. Heydt, Oklahoma City, OK (US); Shawn A. Wakefield, Norman, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/404,958

(22) Filed: Sep. 24, 1999

Related U.S. Application Data
(60) Provisional application No. 60/101,793, filed on Sep. 25, 1998.

(51) Int. Cl.⁷ .............................................. G11B 19/04
(52) U.S. Cl. ......................... 360/60; 360/31; 360/73.03
(58) Field of Search ........................... 360/60.31, 73.03, 360/77.08, 78.04, 78.06, 78.07, 78.09

(56) References Cited

U.S. PATENT DOCUMENTS

| | | |
|---|---|---|
| 4,697,125 A | 9/1987 | Goff et al. |
| 4,720,663 A | 1/1988 | Welch et al. |
| 4,876,491 A | 10/1989 | Squires et al. |
| 4,992,710 A | 2/1991 | Cassat |
| 5,028,852 A | 7/1991 | Dunfield |
| 5,124,606 A | 6/1992 | Eisenbeis |
| 5,168,202 A | 12/1992 | Bradshaw et al. |
| 5,198,733 A | 3/1993 | Wright |
| 5,245,256 A | 9/1993 | Cassat et al. |
| 5,466,997 A | 11/1995 | Utenick et al. |
| 5,467,025 A | 11/1995 | Ray |
| 5,477,103 A | 12/1995 | Romano et al. |
| 5,717,297 A | 2/1998 | Karwath et al. |
| 5,781,363 A | 7/1998 | Rowan et al. |
| 5,783,916 A | 7/1998 | Blackburn |
| 5,821,708 A | 10/1998 | Williams et al. |
| 5,841,252 A | 11/1998 | Dunfield |
| 5,905,348 A | 5/1999 | Nolan |
| 6,104,566 A * | 8/2000 | Stephenson .............. 360/73.03 |

* cited by examiner

*Primary Examiner*—Alan T. Faber
(74) *Attorney, Agent, or Firm*—David K. Lucente; Mitchell K. McCarthy; Derek J. Berger

(57) ABSTRACT

An information handling system, such as a disc drive, includes a base, a disc stack rotatably attached to the base, and an actuator assembly movably attached to the base. Attached to one end of the actuator assembly is one or more transducers. The disc includes data areas and servo areas written at angular locations on the disc. The disc drive also has a disc drive controller which includes a motor speed controller, a write gate controller, and a device for predicting the disc speed at an upcoming servo and disabling the write gate if the predicted disc speed is outside a selected range of disc speeds. The device for predicting the disc speed may further include an abort signal generator that produces an inhibit write gate signal in response to the predicted disc speed being outside the selected range of disc speeds.

18 Claims, 9 Drawing Sheets

MOTOR SPEED OBSERVER FOR DATA PROTECTION IN A DISC DRIVE

RELATED APPLICATION

This application claims the benefit of U.S. Provisional Application Ser. No. 60/101,793, filed Sep. 25, 1998, under 35 U.S.C. 119(e).

FIELD OF THE INVENTION

The present invention relates to the field of mass storage devices. More particularly, this invention relates to an apparatus and method for motor speed control in a disc drive.

BACKGROUND OF THE INVENTION

One key component of any computer system is a device to store data. Computer systems have many different places where data can be stored. One common place for storing massive amounts of data is a computer system is on a disc drive. The most basic parts of the disc drive are a disc that is rotated, an actuator that moves a transducer to various locations over the disc, and electrical circuitry that is used to write and read data to and from the disc. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disc.

The transducer is typically placed on a small ceramic block, also referred to as a slider, that is aerodynamically designed so that it flies over the disc. The slider is passed over the disc in a transducing relationship with the disc. Most sliders have an air-bearing surface ("ABS") which includes rails and a cavity between the rails. When the disc rotates, air is dragged between the rails and the disc surface causing pressure, which forces the head away from the disc. At the same time, the air rushing past the cavity or depression in the air bearing surface produces a negative pressure area. The negative pressure or suction counteracts the pressure produced at the rails. The slider is also attached to a load spring which produces a force on the slider directed toward the disc surface. The various forces equilibrate so the slider flies over the surface of the disc at a particular desired fly height. The fly height is the distance between the disc surface and the transducing head, which is typically the thickness of the air lubrication film. This film eliminates the friction and resulting water that would occur if the transducing head and disc were in mechanical contact during disc rotation. In some disc drives, the slider passes through a layer of lubricant rather than flying over the surface of the disc.

Information representative of data is stored on the surface of the storage disc. Disc drive systems read and write information stored on tracks on storage discs. Transducers, in the form of read/write heads attached to the sliders, located on both sides of the storage disc, read and write information on the storage discs when the transducers are accurately positioned over one of the designated tracks on the surface of the storage disc. The transducer is also said to be moved to a target track. As the storage disc spins and the read/write head is accurately positioned above a target track, the read/write head can store data onto a track by writing information representative of data onto the storage disc. Similarly, reading data on a storage disc is accomplished by positioning the read/write head above a target track and reading the stored material on the storage disc. To write on or read from different tracks, the read/write head is moved radially across the tracks to a selected target track.

The data is divided or grouped together on the tracks. In some disc drives, the tracks are a multiplicity of concentric circular tracks. In other disc drives, a continuous spiral is one track on one side of a disc drive. Servo marks are written to the disc surface. The servo marks provide location information so that the radial position of the head with respect to the disc can be determined. The servo marks are wedges of servo information. Between the servo marks or fields, data is written. The servo marks are used to provide feedback information used to accurately locate the transducer. The write gate or the time when the disc drive writes data to the disc must be accurately controlled so that other information on the disc surface is not overwritten. The speed of the motor also must be accurately controlled to keep the spacing between the data bits consistent so that the spacing after writing is the desired or expected spacing between the bits. If the spacing is too close or too far apart, the disc drive will have difficulty in reading the data.

Generally, the velocity of the motor rotating the discs is checked by measuring the timing between servo marks on the surface of the disc. When the velocity drops or increases to a point outside the range of acceptable speed, the write operation is stopped. There is a problem with current systems. Servo firmware calculates velocity and declares an unsafe condition to prevent further writing. Typically, the unsafe condition is set some time after the motor speed is detected to be out of the range of acceptable speed or velocity limits. If this happens during a write operation, a number of data sectors will have already been written at an out of limit motor speed. When attempting to read the data sectors at a later time, the motor speed will be normal, and the data may be difficult or impossible to recover. One instance where out of limit motor speed occurs is during a power down failure in a disc drive. The motor slows due to the power down failure so that data is written to a sector or sectors at higher bit densities than expected. In other words, the bits are written closer together than normal. The end result is that the data is corrupted. It may be recoverable using deep data recovery techniques, such as changing the motor speed slightly. It also may be unreadable if the bits are too closely spaced and separate transitions can not be discerned.

What is needed is a disc drive that will either minimize the number of data sectors that are written when the motor is spinning at an out of limit speed or velocity, or a disc drive that will eliminate writing information when the motor is spinning at an out of limit speed or velocity.

SUMMARY OF THE INVENTION

An information handling system, such as a disc drive, includes a base, a disc stack rotatably attached to the base, and an actuator assembly movably attached to the base. Attached to one end of the actuator assembly is one or more transducers. The disc includes data areas and servo areas written at angular locations on the disc. The disc drive also has a disc drive controller which includes a motor speed controller, a write gate controller, and software for predicting the disc speed at an upcoming servo area and disabling the write gate if the predicted disc speed is outside a selected range of disc speeds. Predicating the disc speed may further include an abort signal generator that produces an inhibit write gate signal in response to the predicted disc speed being outside the selected range of disc speeds. Predicting the disc speed may also include a table of previous servo areas and disc speeds associated with the previous servo areas. Predicting the disc speed may also include software for fitting a trend line to a table disc speeds associated with a current servo area and at least one previous servo area.

The disc drive employs a method which includes calculating a predicted velocity at the next servo mark based on the measured velocities at a plurality of servo marks, comparing the predicted velocity to a range of reference values, and inhibiting the write operation when the predicted velocity is outside the range of reference values. Predicting the speed of the motor at the next angular location of the disc further includes plotting the speed of the motor at several previous angular locations of the motor, and determining a trend in the speed of the motor. Predicting the speed of the motor at the next angular location of the disc further may also include plotting the speed of the motor at several previous servo sectors which are determinative of the angular location of the motor, and determining a trend in the speed of the motor. Predicting the speed of the motor at the next angular location of the disc further may also include plotting the speed of the motor at several previous servo sectors on the surface of the disc to which data may be written. The servo sectors are determinative of the angular location of the motor. Plotting the speed of the servo sectors allows a trend in the speed of the motor to be determined. The write operation is aborted when the predicted speed is outside the selected range of speeds. The abort signal may be sent to a controller which controls the write operation. The write operation may also be aborted by sending an abort signal to a controller, and sending a write disable signal from the controller to the transducer.

A method for controlling the write operation in a disc drive is also disclosed. The method includes monitoring the speed of a motor, and predicting the speed of the motor at the next angular location of the disc. The predicted speed for the next angular location is compared to a selected range of speeds. The write operation is aborted when the predicted speed is outside the selected range of speeds. Predicting the speed of the motor at the next angular location of the disc includes plotting the speed of the motor at several previous angular locations of the motor, and determining a trend in the speed of the motor. The write operation is aborted when the predicted speed is outside the selected range of speeds. An abort signal is sent to a controller which controls the write operation. The write operation may also be aborted by sending an abort signal to a controller, and sending a write disable signal from the controller to the transducer.

Advantageously, predicting when the speed of the disc will travel outside of its limits, prevents or minimizes the number of sectors containing corrupted data. Another way of putting this is that the method will minimize or prevent writing data to a data area of the disc at an unacceptable data density. This invention also minimizes the number of unrecoverable errors or the number of write errors that need to use deep data recovery procedures. Deep data recovery procedures are used to read data when all else fails. The deep data recovery procedures take time. The performance of the disc drive is enhanced. Furthermore, the disc drive is more dependable over its life. In addition, the data stored on the disc drive using the apparatus and method is readable and less prone to error.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
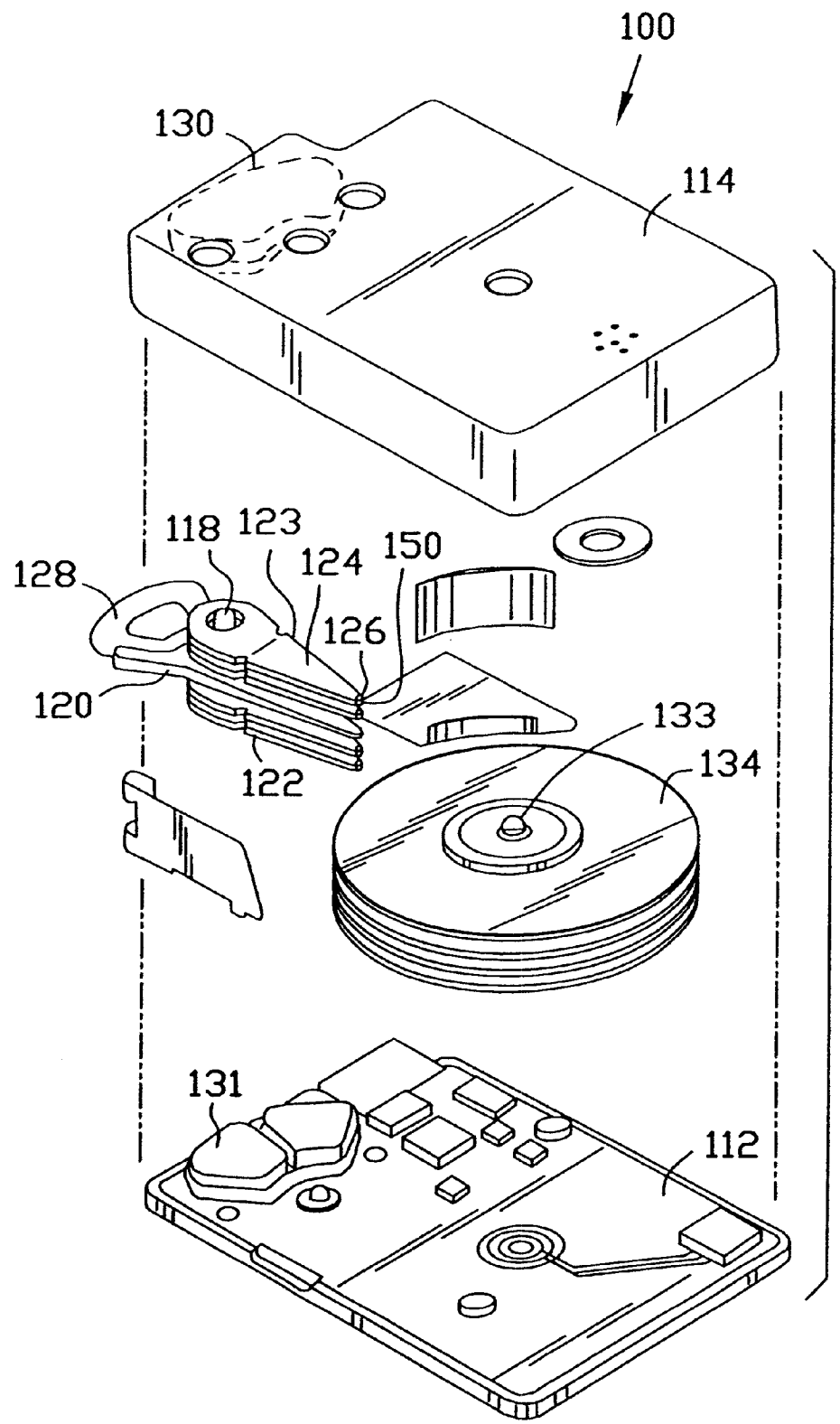
FIG. 1 is an exploded view of a disc drive with a multiple disc stack.

The invention described in this application is useful with all mechanical configurations of disc drives having either rotary or linear actuation. In addition, the invention is also useful in all types of disc drives including disc drives, zip drives, floppy disc drives and any other type of drives where unloading the transducer from a surface and parking the transducer may be desirable. FIG. 1 is an exploded view of one type of a disc drive 100 having a rotary actuator. The disc drive 100 includes a housing or base 112, and a cover 114. The base 112 and cover 114 form a disc enclosure. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150. The slider 126 with the transducer 150 form what is many times called the head. It should be noted that many sliders have one transducer 150 and that is what is shown in the figures. It should also be noted that this invention is equally applicable to sliders having more than one transducer, such as what is referred to as an MR or magnetic resistive head in which one transducer 150 is generally used for reading and another is generally used for writing. On the end of the actuator arm assembly 120 opposite the load springs 124 and the sliders 126 is a voice coil 128.

Attached within the base 112 is a first magnet 130 and a second magnet 131. As shown in FIG. 1, the second magnet 131 is associated with the cover 114. The first and second magnets 130, 131, and the voice coil 128 are the key components of a voice coil motor which applies a force to the actuator assembly 120 to rotate it about the actuator shaft 118. Also mounted to the base 112 is a spindle motor. The spindle motor includes a rotating portion called the spindle hub 133. In this particular disc drive, the spindle motor is within the hub. In FIG. 1, a number of discs 134 are attached to the spindle hub 133. In other disc drives a single disc or a different number of discs may be attached to the hub. The invention described herein is equally applicable to disc drives which have a plurality of discs as well as disc drives that have a single disc. The invention described herein is also equally applicable to disc drives with spindle motors which are within the hub 133 or under the hub.

Figure 2:
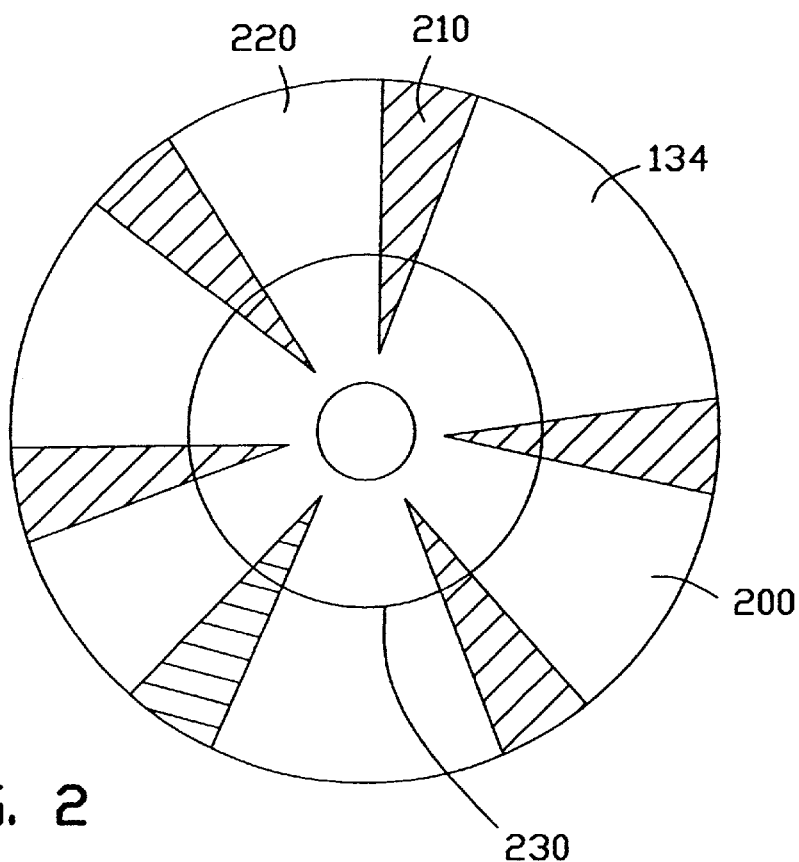
FIG. 2 is a diagram of the disc surface of a disc drive.

FIG. 2 is a diagram of the disc surface 200 of disc 134 from a disc drive. The disc surface 200 includes servo information wedges 210. As shown on the disc in FIG. 2, there are seven servo information wedges 210. Only one is labeled for the sake of simplicity. In actuality, there may be as many as one hundred twenty servo information wedges positioned on the disc surface 200 of the disc 134. Positioned between the servo wedges 210 are data storage areas 220. Data is stored between these servo wedges 210. The servo wedges 210 provide angular location information along the surface of the disc. In other words, the disc drive 100 can determine the angular position of the disc 134 from the information housed in one of the servo wedges 210 of the disc surface 200. The disc surface also comprises a plurality or multiplicity of tracks. A single track 230 is shown in FIG. 2. The track 230 includes a portion of the servo information wedge as well as a portion of the data area 220. The track 230 is further detailed in FIG. 3. Returning once again to FIG. 2, it should be noted that FIG. 2 shows a disc 134 on a disc surface 200 which has a very simple embedded servo pattern, which includes no zones. The invention can be described easily referring to the disc 134 shown in FIG. 2. Of note, however, is that the invention can also be used on a disc surface 200 which includes zones and zone recording. In addition, this invention could also be used where the servo is on a dedicated servo surface.

Figure 3:
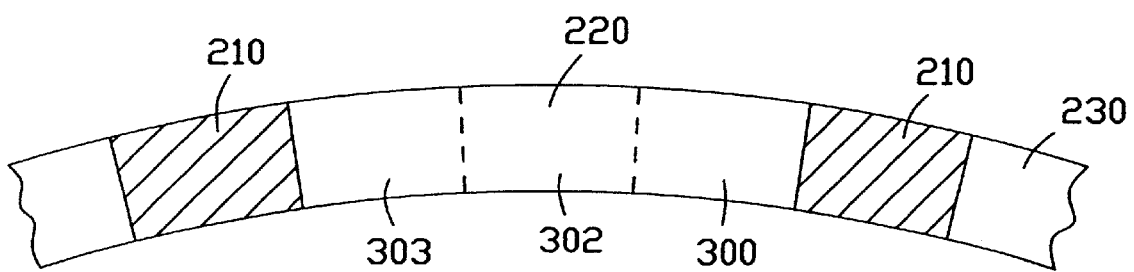
FIG. 3 is a representation of a track on a disc which includes data and servo information.

FIG. 3 is a representation of track 230 on the disc 134 which include data 220 and servo information 210. The servo information 210 is the information stored in the angular wedges 210. The servo information includes the particular track number or information that can be used to calculate the particular track number as well an angular location and information that allows the transducer 150 to be over or near the center line of the track 230. The data section 220 includes one or more data sectors 300, 302, 303. The data sectors 300, 302, 303 are separated by dashed lines in the diagram of the track 230 shown in FIG. 3. Of course it should be noted that different numbers of data sectors 300, 302, 303 can be positioned between successive parallel wedges 210.

Figure 4:
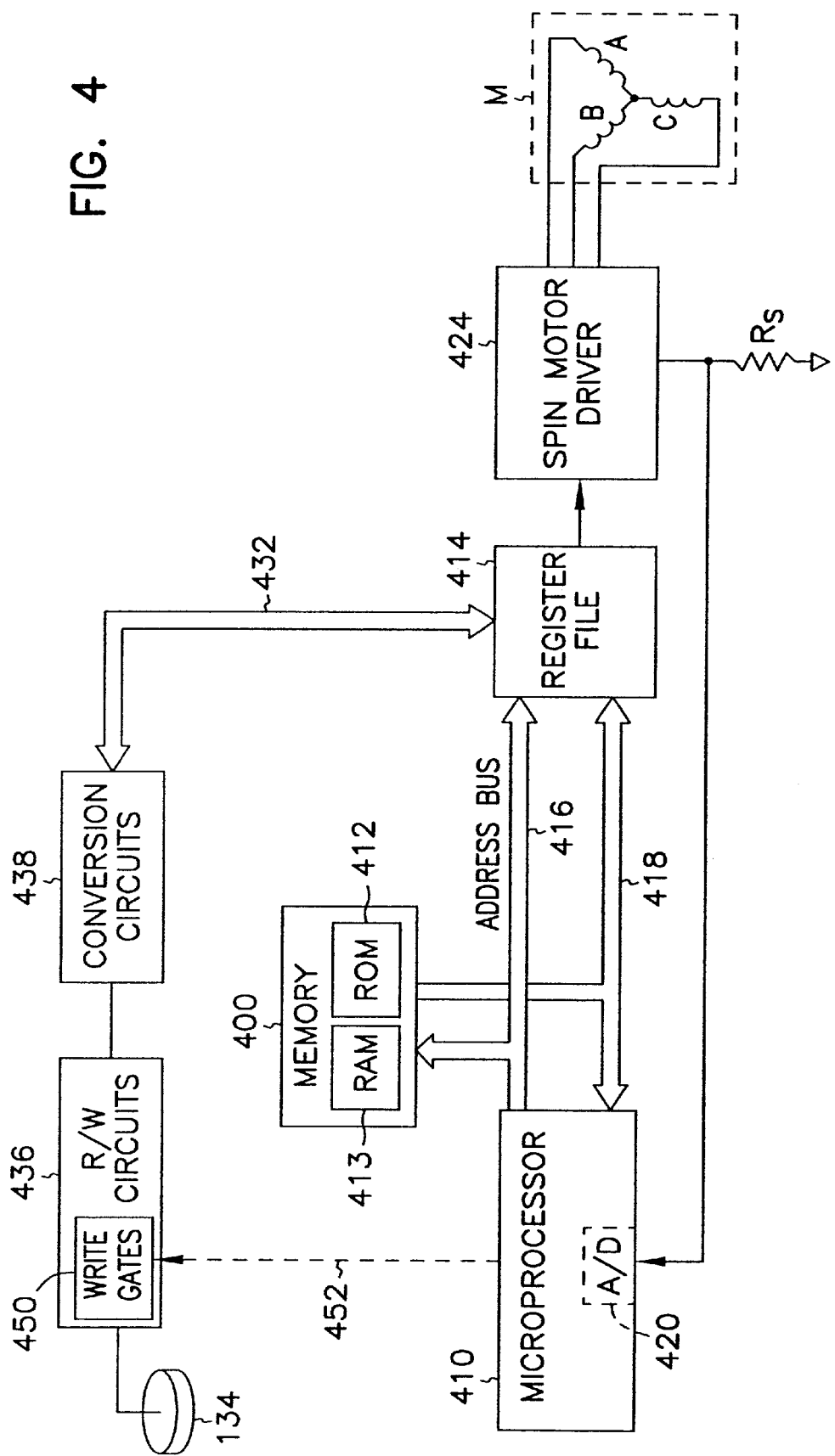
FIG. 4 is a block diagram of the control apparatus for a disc drive.

As FIG. 4 illustrates, a microprocessor 410 is coupled to a memory 400 which has a read-only member (ROM) 412 and a random access memory (RAM) 413. The microprocessor is also attached to a register file 414 by an address bus 416 and a data bus 418. The register file 414 includes registers for holding control information that is applied to a spin-motor controller or driver 424 in the form of control signals that are communicated thereto on six signal lines 426. In response to the control signals, the spin-motor driver operates to switch application of a positive voltage and ground to various pairs of the nodes 1, 2, 3 of the motor M (leaving a third node attached to a high impedance), as briefly described above. The current through the motor M, during the time a positive voltage and ground are applied thereto, develops a voltage across a sense resistor R, that forms a feedback signal applied to an analog to digital converter (A/D) 420 of the microprocessor 410, producing digital information used by the microprocessor 410 to control motor operation via the control signals applied to the spin-motor driver 424 via the signal lines 426.

As FIG. 4 also illustrates, the register file 414 is connected to conversion circuits 430 via an eight-bit bus 432. Conversion circuits 430 are, in turn, connected to the read/write head 434 via read/write (R/W) circuits 436. Additional registers (not shown) are contained in the register file 414 to buffer data communicated between the microprocessor 410 and the conversion circuits 438. The read/write circuits 436 also includes a write gate 450. Write gate 450 determines when the data will be written by a transducer 150 (shown in FIG. 1) onto the surface of the disc 134. The microprocessor includes a control line 452 which either goes high or low in order to enable or disable the write gate 450.

Figure 5:
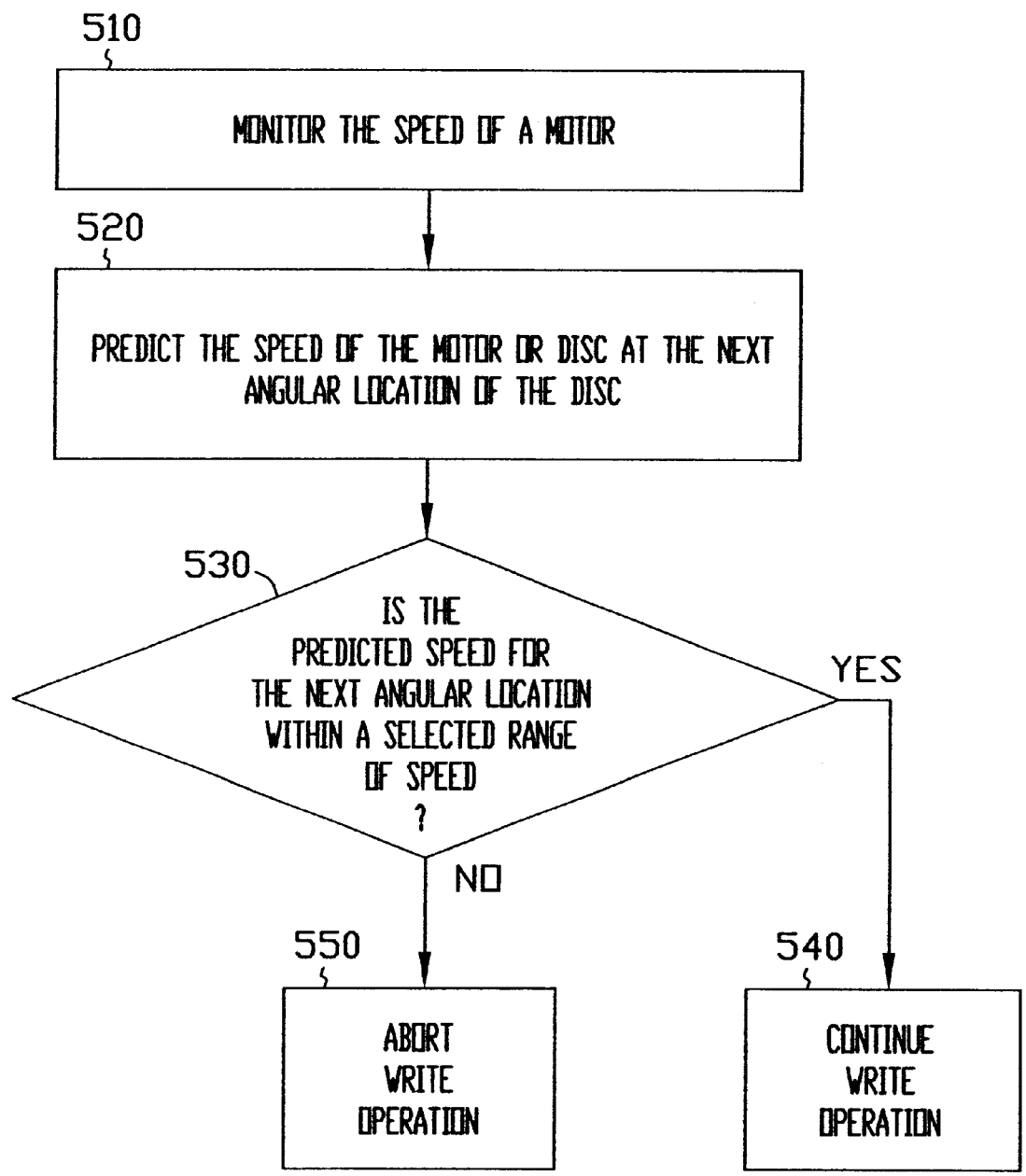
FIG. 5 is a block diagram of the method for controlling the disc drive.

FIG. 5 is a block diagram of the method for controlling the disc drive 100. Initially the speed of the motor or speed of the disc is monitored, as depicted by step 510. The speed of the motor or disc 510 is monitored by determining the speed at various servo wedge 210 along the surface of the disc 200. These are stored and then used to predict the speed of the motor or disc at the next angular location of the disc, as depicted by step 520 in FIG. 5. The next angular location of the disc corresponds to a servo wedge 210. The next step, depicted by decision block 530 is to compare the predicted speed for the next angular location with a selected range of speeds. In other words, decision block contains the questions, "Is the predicted speed for the next angular location within a selected range of the speeds?". If the answer is yes, the write operation continues as shown by box 540. If the answer is no, the write operation is aborted as depicted by box 550 in FIG. 5.

Figure 6:
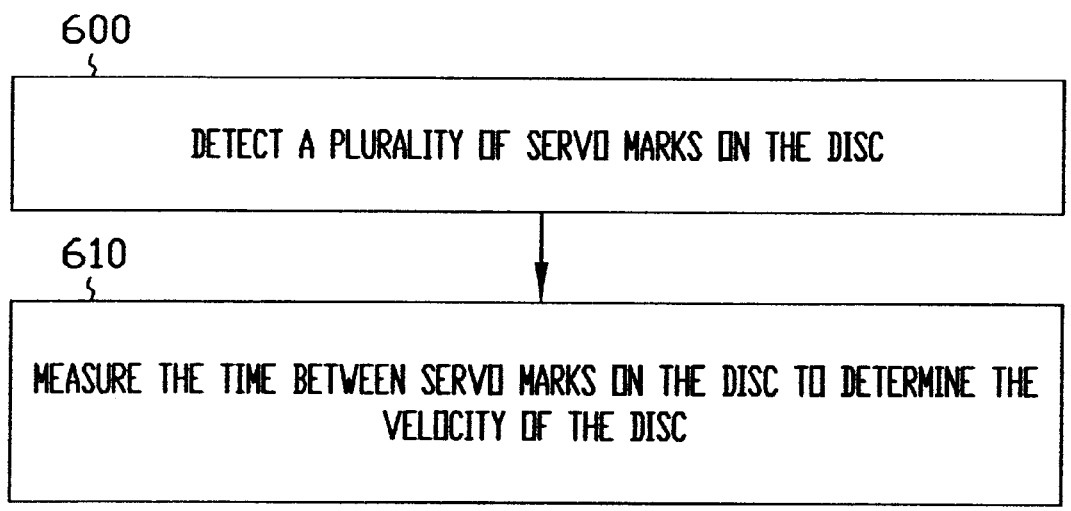
FIG. 6 is a block diagram of the method for monitoring the speed of the disc in the disc drive.

FIG. 6 shows a block diagram of the method for monitoring the speed of the disc or the motor in the disc drive 100. Initially, a plurality of servo marks which correspond to the information in the servo wedges on the disc surface 200 are detected, as depicted by box 600. The time between the servo marks is measured and used to determine the velocity of the disc or speed or the disc or speed of the motor. The velocity of the disc and the speed of the disc and the speed of the motor are all related. Measuring the time between the servo marks on the disc to determine the velocity of the disc is depicted by box 610 of FIG. 6. The results of the velocity or the speed of the disc are typically kept in a table form with a selected number of previous servo marks and their velocities depicted as samples. A first-in, first-out type of stack up memory could be used to maintain a selected number of samples which are the most current. For example, as few as three or four servo marks and their velocity may be all that is necessary in order to determine or predict a velocity or speed which will be attained at the next servo mark 210. In other instances, many more servo marks may be necessary in order to accurately predict the next velocity at the next servo mark. The number of entries in the first-in, first-out memory (FIFO) will correspond to the number of servo marks and the determined velocity used in the process of predicting the speed of the disc or the speed of the motor.

Figure 7:
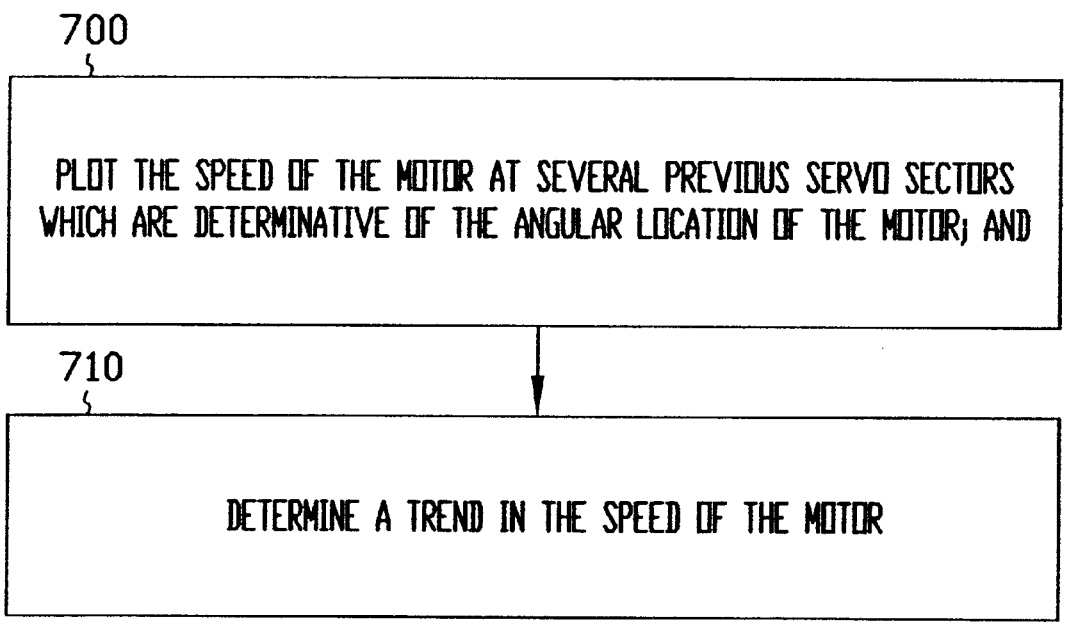
FIG. 7 is a block diagram of the method for predicting the speed of the disc in the disc drive.
Figure 8:
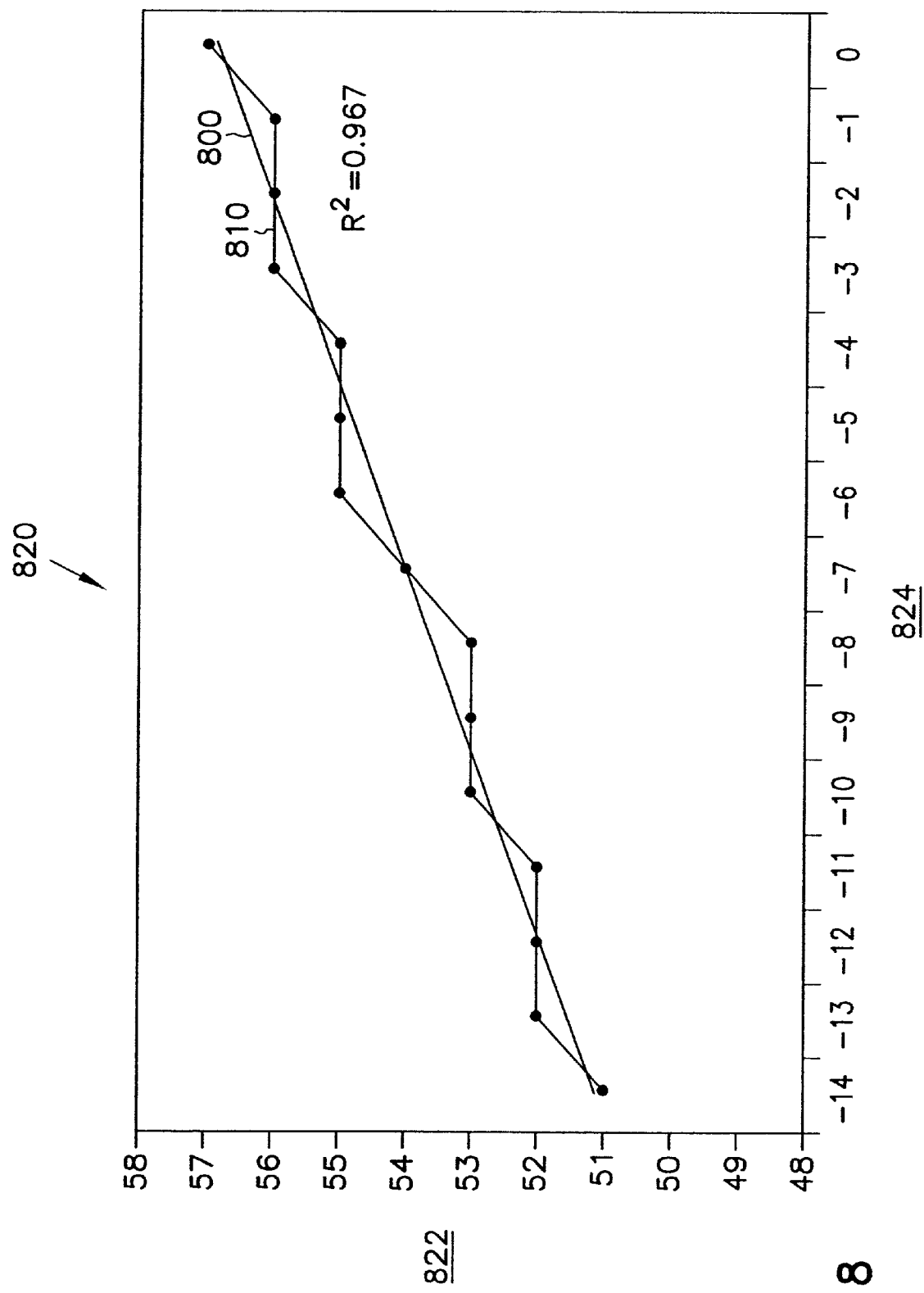
FIG. 8 is a plot of time between speed samples and the same number which also includes a tend line which can be used to predict the speed of the disc at the next sample time.

FIG. 7 is a block diagram of the method for predicating the speed of the disc or the speed of the motor in the disc drive 100. As depicted by box 700, the speed of the motor or the speed of the disc at several previous servo sectors determinative of angular location are plotted. From the plot, a trend line or trend speed of the motor or speed, of the disc is then determined as depicted by box 710 in FIG. 7. In other words, the data stored in a first-in, first-out register (FIFO) is plotted. Table 1, shown on the next page, shows the entries for the speed of each of the last 21 sectors. The most current sector, sector 0, had a hexadecimal speed of 0057. The oldest data, depicted by sector -20, had a hex speed of 0051. This can be seen the sector speed for sectors -14 to -20 all have the same hex speed of 0051. The sector speeds from sectors -13 to 0 increase. This depicts a slow down in the disc speed. As the speed slows, the hexadecimal numbers increase since the time between the samples or data wedges 210 increases which reflects a slowing in the rotational speed of the disc 134. Once the value reaches 0057, the motor is considered to be too slow, and an abort write signal on line 452 is sent from the microprocessor 410 to the write gate 450 of the read/write circuits 436. The too slow condition can be predicted using previous speed samples, as is shown in FIG. 8.

TABLE 1

MACHINE 1 - State Listing

| SAMPLE II | SPEED Hex |
|---|---|
| -20 | 0051 |
| -19 | 0051 |
| -18 | 0051 |
| -17 | 0051 |
| -16 | 0051 |
| -15 | 0051 |
| -14 | 0051 |
| -13 | 0052 |
| -12 | 0052 |
| -11 | 0052 |
| -10 | 0053 |
| -9 | 0053 |
| -8 | 0053 |
| -7 | 0054 |
| -6 | 0055 |
| -5 | 0055 |
| -4 | 0055 |
| -3 | 0056 |
| -2 | 0056 |
| -1 | 0056 |
| 0 | 0057 |

FIG. 8 is a plot of the time between speed samples and the sample number. The resulting graph or plot 820 represents a motor speed decay condition. If the sped were increasing, the plot would represent a motor speed increase condition. The resulting graph or plot 820 includes a first axis 822, which represents the time between samples, and a second axis 824, which represents the sample number. FIG. 8 also includes a trend line 800 which can be used to predict the time between the samples or the speed at which the disc is spinning. FIG. 8 shows a plot of the samples -14 to -1 from Table 1 on axis 824. Each of the plotted samples is shown connected by a line 810. A least means square fit between the various samples and the time between the samples, represented by axis 822, is depicted by line 800. Line 800 can then be used to predict that the sample 0 would be too slow or below the sample time of 57 units. As can be seen, a range of speeds are acceptable at which data can be written. The range has a top speed and a bottom speed which are depicted by an unacceptably short time between samples and an unacceptably longer time between samples. The example shown in FIG. 8 shows the speed declining to a point where the disc is spinning too slow, which is depicted by a longer time between the samples. Of course, a too fast condition where the write operation might overwrite servo 210 can also be predicted.

Figure 9:
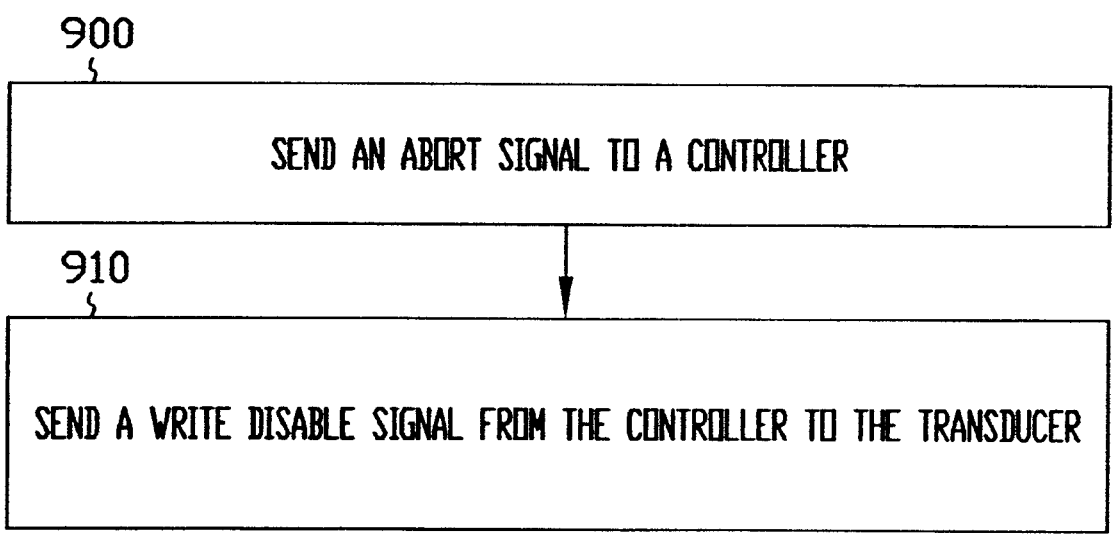
FIG. 9 is a block diagram of the method for aborting the write operation in a disc drive.

FIG. 9 is a diagram of the method for aborting the write operation in a disc drive 100. As depicted by box 900, an abort signal is sent to a controller or microprocessor 410. In turn, a write disable signal is sent from the controller or microprocessor 410 to the write controller or write gate 450. Sending the write disable signal from the microprocessor 410 or controller to the transducer 150 is depicted by step 910 in FIG. 9.

Figure 10:
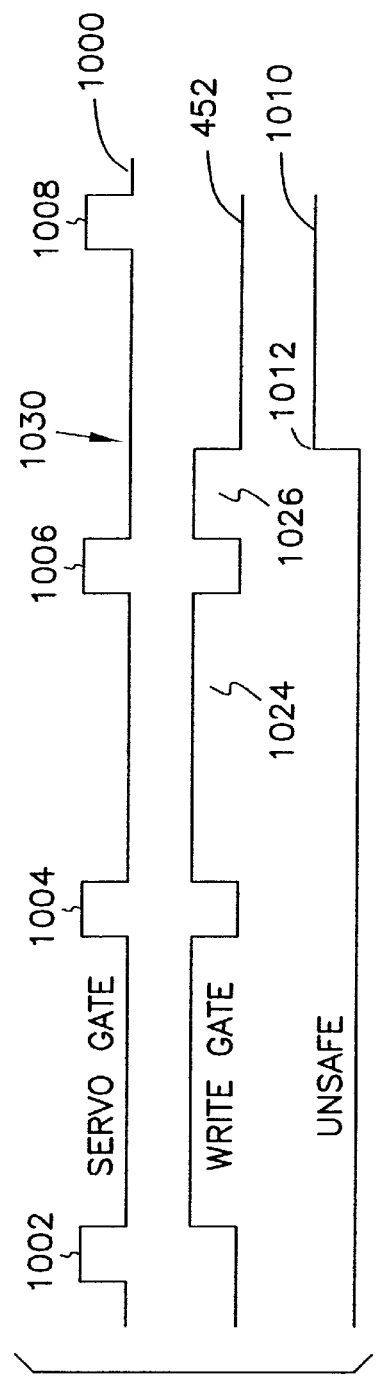
FIG. 10 is a timing chart showing the prior art signals.
Figure 11:
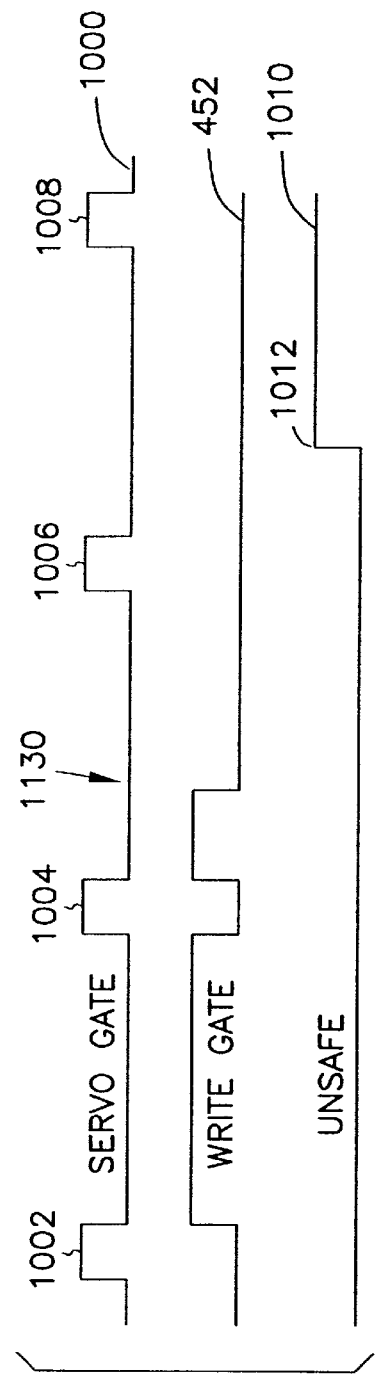
FIG. 11 is a timing chart showing the signals associated with the invention.

FIGS. 10 and 11 show the effect of the new method for predicting when the speed of the motor or the speed of the disc is going to fall below or go above a selected range of acceptable speeds. FIG. 10 is a timing chart showing the prior art signals which open the servo gate 1000 and open the write gate 452.

It should be noted that the servo gate signal 1000 goes high at each of the successive servo wedges 210. The servo gate goes high at locations 1002, 1004, 1006 and 1008. The write gate goes high at the data areas 220 between the data wedges 210. The write gate will remain high until a servo signal is detected, at which time the write gate is disabled so that the transducer can read the servo. The write gate can be brought low or disabled when an unsafe condition is determined, which is depicted by signal 1010 going high such as at 1012. In this particular example, the speed or rotational velocity of the motor is considered "ok" or within an acceptable range when the servo is read at location 1002 and 1004. At location 1006, the rotational velocity or speed of the motor is deemed to be outside of the specified range. A speed fault is detected at a time after 1006, as depicted by reference number 1030. Once this is determined at this time, the unsafe signal 1012 goes high, which in turn disables the write gate signal 452. When the unsafe signal is disabled by a low unsafe signal 1010, the write gate is enabled. An unsafe condition is depicted by the unsafe signal 1010 going high and this brings the write gate signal low or disables the write gate 452. As shown in FIG. 10, corrupt data can be written either before or after the third servo burst 1006 or servo wedge 210. Corrupt data can be written during the times when write gate signal 451 is high at time 1024 or at time 1026. In other words, data that is too closely packed together or that is too far spaced apart can be written in the data sections before or after the third servo wedge where the speed was determined to be poor.

The prior art method is shown in FIG. 10. In the prior art method, the servo gate is opened when the servo is detected and the clock cycles can be counted between when the servo gate opens in order to determine if the speed is okay. As shown in FIG. 10, the speed is okay at a first servo wedge 210 and at a second servo wedge 210. At a time 1006 of third servo wedge 210, the speed is determined to be outside of an acceptable range. At this time the speed fault is detected, an unsafe condition is enabled as depicted by signal 1010. When the speed fault is detected, the write gate is disabled or sent low as shown by reference number 1012. The problem is that corrupt data can be written to the data areas before and after the third servo area 210, depicted by reference numbers 1024 and 1026.

FIG. 11 is a timing chart showing the signals associated with the invention. Once again, just like the example shown in FIG. 10, the speed is okay at the first servo burst 210 and at the second servo burst 210, as depicted by arrows 1002 and 1004 on the timing diagram of FIG. 11. At the third servo burst 210, the speed is poor or outside a range at the location depicted by arrow 1006. In this instance, the unsafe condition is predicted before the third servo burst or third servo wedge 210. The unsafe signal 1010 goes high when the prediction is made. The unsafe condition goes high between the second and third servo wedge or servo burst 210. The unsafe condition disables the write gate by sending write gate signal 452 low. The unsafe condition goes high when the poor speed is predicted. The write gate signal on line 452 is disabled sooner by predicting the unsafe condition sooner than in the prior art.

Advantageously, the method and apparatus described for predicting when the speed of the disc is outside of its limits prevents or minimizes the number of sectors which contain corrupted data or data written at a speed outside the range of acceptable speeds. Another way of putting this is that the method will minimize or prevent writing data to a data area of the disc at an unacceptable data density. This invention also minimizes the number of unrecoverable errors or the number of write errors that need to use deep data recovery procedures. Deep data recovery procedures are used to read data when all else fails. The deep data recovery procedures take time. The performance of the disc drive is enhanced. Furthermore, the disc drive is more dependable over its life. In addition, the data stored on the disc drive using the apparatus and method is readable and less prone to error.

Figure 12:
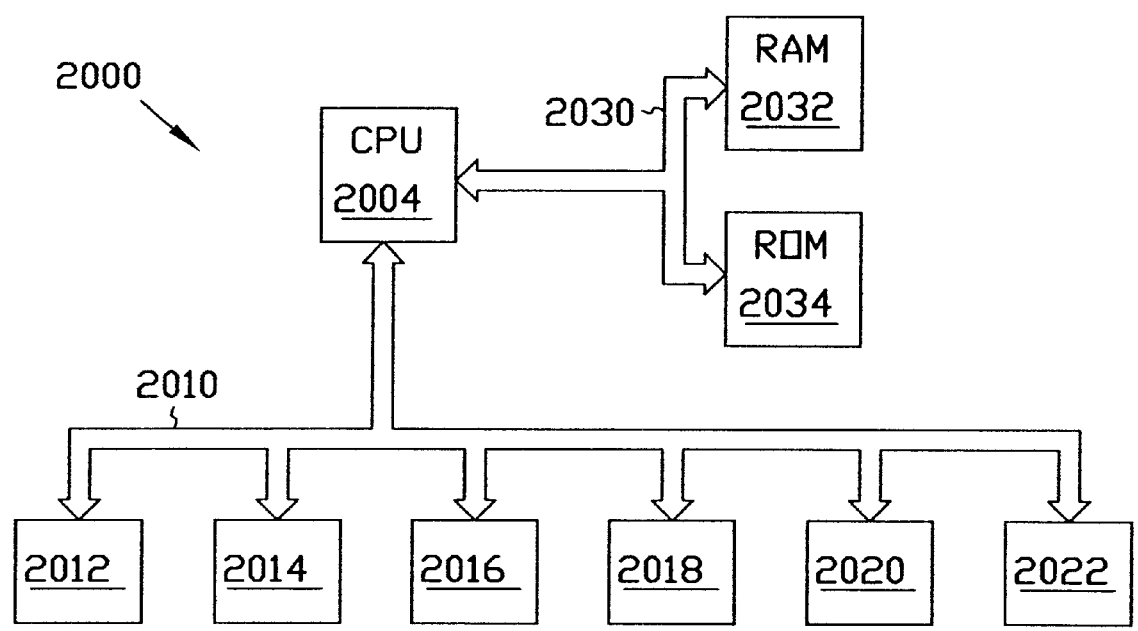
FIG. 12 is a schematic view of a computer system.

FIG. 12 is a schematic view of a computer system. Advantageously, the invention is well-suited for use in a computer system 2000. The computer system 2000 may also be called an electronic system or an information handling system and includes a central processing unit, a memory and a system bus. The information handling system includes a central processing unit 2004, a random access memory 2032, and a system bus 2030 for communicatively coupling the central processing unit 2004 and the random access memory 2032. The information handling system 2002 includes a disc drive device which includes the ramp described above. The information handling system 2002 may also include an input/output bus 2010 and several devices peripheral devices, such as 2012, 2014, 2016, 2018, 2020, and 2022 may be attached to the input output bus 2010. Peripheral devices may include disc drives, magneto optical drives, floppy disc drives, monitors, keyboards and other such peripherals. Any type of disc drive may use the method for loading or unloading the slider onto the disc surface as described above.

Conclusion

In conclusion, a method for determining when to inhibit a write operation within a disc drive is disclosed. The disc drive includes a disc 134 having a plurality of servo marks 210 written to the disc 134. Data 220 is written to the disc 134 in areas other than where servo information is located. The disc drive 100 also includes a motor for spinning the disc 134 at a desired speed. The method includes calculating a predicted velocity at the next servo mark 210 based on the measured velocities at a plurality of servo marks 520, comparing the predicted velocity to a range of reference values 530, and inhibiting the write operation when the predicted velocity is outside the range of reference values 550. Inhibiting the write operation includes aborting the write operation 910 before writing data to the disc between the servo mark 210 where the predicted velocity is outside the range of reference values and the servo mark 210 immediately subsequent thereto. Inhibiting the write operation may also include aborting a write gate signal before writing data to the disc between the servo mark where the predicted velocity is outside the range of reference values 550 and the servo mark immediately subsequent thereto. The method for determining when to inhibit a write operation within a disc drive may also include detecting a plurality of servo marks on the disc 600, and measuring the time between servo marks on the disc to determine the velocity of the disc 610.

A method for controlling the write operation in a disc drive is also disclosed. The method includes monitoring the speed of a motor 510, predicting the speed of the motor at the next angular location of the disc 520, comparing the predicted speed for the next angular location to a selected range of speeds 530, and aborting the write operation when the predicted speed is outside the selected range of speeds 550. Predicting the speed of the motor at the next angular location of the disc further includes plotting the speed of the motor 600 at several previous angular locations of the motor, and determining a trend in the speed of the motor 610. Predicting the speed of the motor at the next angular location of the disc further may also include plotting the speed of the motor at several previous servo sectors which are determinative of the angular location of the motor 700, and determining a trend in the speed of the motor 710. Predicting the speed of the motor at the next angular location of the disc further may also include plotting the speed of the motor at several previous servo sectors on the surface of the disc to which data may be written, said servo sectors determinative of the angular location of the motor, and determining a trend in the speed of the motor. Aborting the write operation when the predicted speed is outside the selected range of speeds 550 may include sending an abort signal to a controller 900 which controls the write operation. Aborting the write operation when the predicted speed is outside the selected range of speeds may include sending an abort signal to a controller 900, and sending a write disable signal from the controller to the transducer 910.

Also disclosed is a disc driver 100 having a base 112, and a disc 134 rotatably attached to the base. The disc 134 includes data area 220 and servo areas 210 written at angular locations on the disc. The disc drive also has a disc drive controller 400 which includes a motor speed controller, a write gate controller 450, and software for predicting the disc speed at an upcoming servo area 210 and disabling the write gate 452 if the predicted disc speed is outside a selected range of disc speeds. Software for predicting the disc speed may further include an abort signal 1010 generator that produces an inhibit write gate signal 452 in response to the predicted disc speed being outside the selected range of disc speeds. Software for predicting the disc speed may also produce an abort signal if the predicted disc speed is outside a selected range of disc speeds 550, and, in response to the write signal, a write gate controller 450 which inhibits the write gate. Software for predicting the disc speed may also include a table of previous servo areas and disc speeds associated with the previous servo areas. Software for predicting the disc speed may also include a transducer 150 which reads the servo areas 210, software for determining the disc speed by measuring the time between servo area 210, and a table of previous servo areas and disc speeds associated with the previous servo areas. Software for predicting the disc speed may also include a device for fitting a trend line 800 to a table of disc speeds associated with a current servo area and at least one previous servo area, or a device for fitting a trend line to a table of disc speeds associated with a current servo area and a plurality of previous servo areas.

Also disclosed is a disc drive having a hub 133 ratable to a plurality of angular locations, and a disc 134 for storing information including data attached to the hub. The disc includes servo areas 210 indicative of an angular location on the disc, and data areas 220 positioned between the servo areas. The disc drive also includes software for predicting the disc speed at an upcoming servo area and disabling a write operation if the predicted disc speed is outside a selected range of disc speeds.

It is to be understood that the above description is intended to be illustrative, and not restrictive. Many other

What is claimed is:

1. A method for determining when to inhibit a write operation within a disc drive, the disc drive including a disc having a plurality of servo marks written to the disc, wherein data is written to the disc in areas other than where servo marks are written, the method comprising steps of:

(a) calculating a predicted velocity of the disc at a next servo mark based on measured velocities at several of the plurality of servo marks;

(b) comparing the predicted velocity to a range of reference values; and (c) inhibiting the write operation when the predicted velocity is outside the range of reference values.

2. The method of claim 1 wherein the inhibiting step (c) includes aborting the write operation before writing data to the disc between the servo marks where the predicted velocity of the disc is outside the range of reference values.

3. The method of claim 1 wherein the inhibiting step (c) includes aborting a write gate signal before writing data to the disc between the servo marks where the predicted velocity of the disc is outside the range of reference values.

4. The method of claim 1 wherein the calculating step (a) further comprises:

(a)(i) measuring a time between servo marks on the disc.

5. A method for controlling write operations in a disc drive, comprising steps of:

(a) monitoring speed of a motor;

(b) predicting speed of the motor at a next angular location of a rotatable recording disc;

(c) comparing the predicted speed for the next angular location to a selected range of speeds; and (d) aborting the write operation when the predicted speed is outside the selected range of speeds.

6. The method of claim 5 wherein the predicting step (b) further comprises steps of:

(b)(i) plotting speed of the motor at several previous angular locations of the motor; and (b)(ii) determining a trend in the speed of the motor.

7. The method of claim 5 wherein the predicting step (b) further comprises steps of:

(b)(i) plotting speed of the motor at several previous servo sectors which are determinative of an angular location of the motor; and (b)(i) determining a trend in the speed of the motor.

8. The method of claim 5 wherein the predicting step (b) further comprises steps of:

(b)(i) plotting speed of the motor at several previous servo sectors on the surface of the disc to which data may be written, the servo sectors being determinative of angular location of the motor; and (b)(ii) determining a trend in the speed of the motor.

9. The method of claim 5 wherein the aborting step (d) includes sending an abort signal to a controller which controls the write operation.

10. The method of claim 5 wherein the aborting step (d) further comprises steps of:

(d)(i) sending an abort signal to a controller;

(d)(ii) sending a write disable signal from the controller to a transducer.

11. A disc drive comprising:

a base;

a disc rotatably attached to the base, the disc including data areas and servo areas written at angular location on the disc; and a disc drive controller, comprising:
      a motor speed controller;
      a write gate controller; and
      a device for predicting the rotational velocity at an upcoming servo area and disabling the write gate controller if the predicted disc rotational velocity is outside a selected range of disc rotational velocities.

12. The disc drive of claim 11 wherein the device for predicting the disc rotational velocity further comprises an abort signal generator that produces an inhibit write gate signal in response to the predicted disc speed being outside the selected range of disc rotational velocities.

13. The disc drive of claim 11 wherein the device for predicting the disc rotational velocity produces an abort signal if the predicted disc rotational velocity is outside a selected range of disc rotational velocities, the write gate controller inhibiting the write gate in response to an abort signal.

14. The disc drive of claim 11 wherein the device for predicting the disc rotational velocity further comprises a table of previous servo areas and disc rotational velocities associated with the previous servo areas.

15. The disc drive of claim 11 wherein the device for predicting the disc rotational velocity further comprises:

a transducer which reads the servo areas;

a device for determining the disc rotational velocity by measuring time elapsed between servo area; and a table of previous servo areas and disc rotational velocities associated with the previous servo area.

16. The disc drive of claim 15 wherein the device for predicting the disc rotational velocity further comprises a device for fitting a trend line to table of disc rotational velocity associated with a current servo area and at least one previous servo area.

17. The disc drive of claim 15 wherein the device for predicting the disc rotational velocity further comprises a device for fitting a trend line to a table of disc rotational velocities associated with a current servo area and a plurality of previous servo areas.

18. A disc drive comprising:

a hub rotatable to a plurality of angular locations;

a disc for storing information including data, the disc being attached to the hub, the disc including
      servo areas indicative of an angular location on the disc; and
      data areas positioned between the servo area; and means for predicting disc rotational velocity at an upcoming servo area and disabling a write operation if the predicted disc rotational velocity is outside a selected range of disc rotational velocities.

* * * * *